Feb. 28, 1939.  F. ADAM  2,148,521
JAIL LOCKING DEVICE AND THE LIKE
Filed May 27, 1937  4 Sheets-Sheet 1
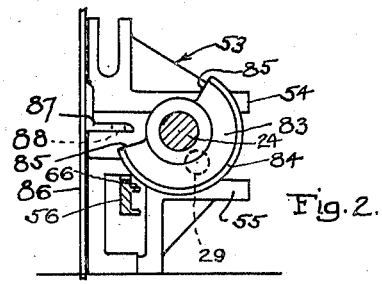
Fig. 2.
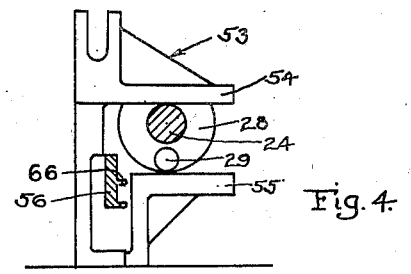
Fig. 4.
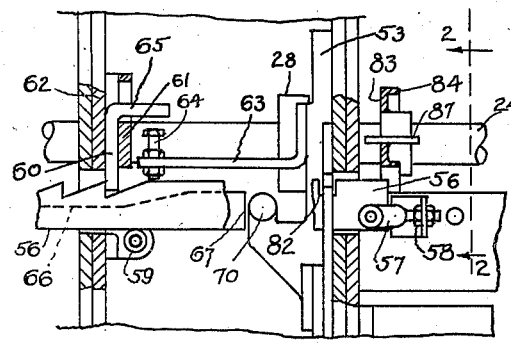
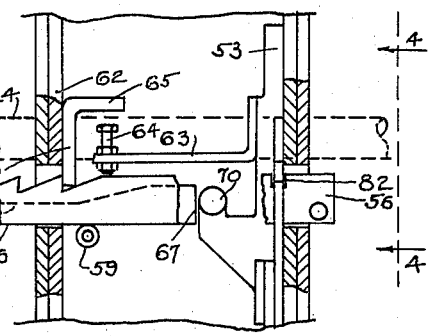
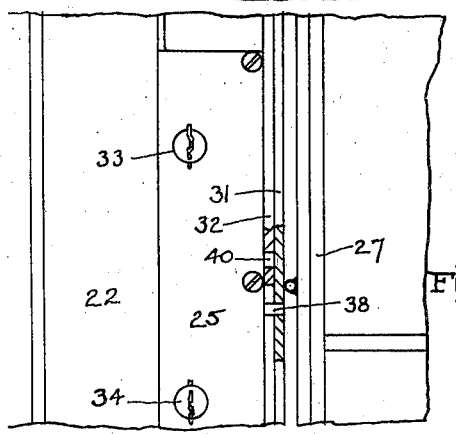
Fig. 1.
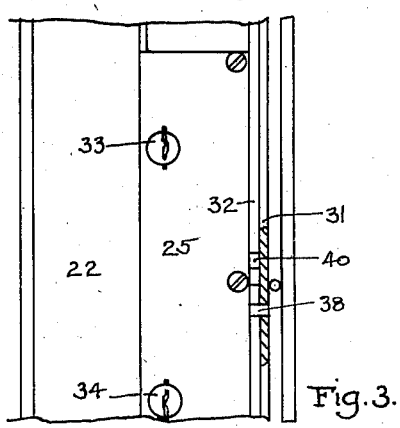
Fig. 3.
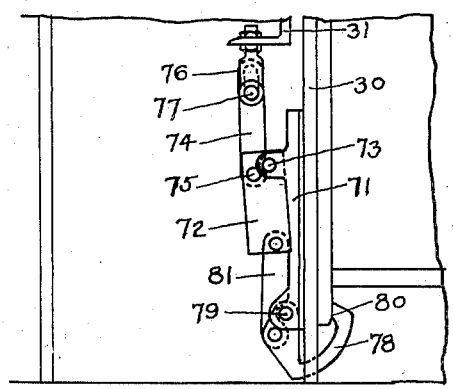
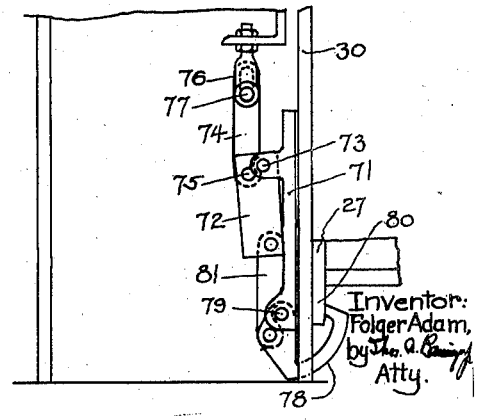
Inventor:
Folger Adam,
by Thos. A. Banning
Atty.

Feb. 28, 1939.　　　　　F. ADAM　　　　　2,148,521
JAIL LOCKING DEVICE AND THE LIKE
Filed May 27, 1937　　　4 Sheets-Sheet 2

Inventor:
Folger Adam,
by Thos. O. Loony
Atty.

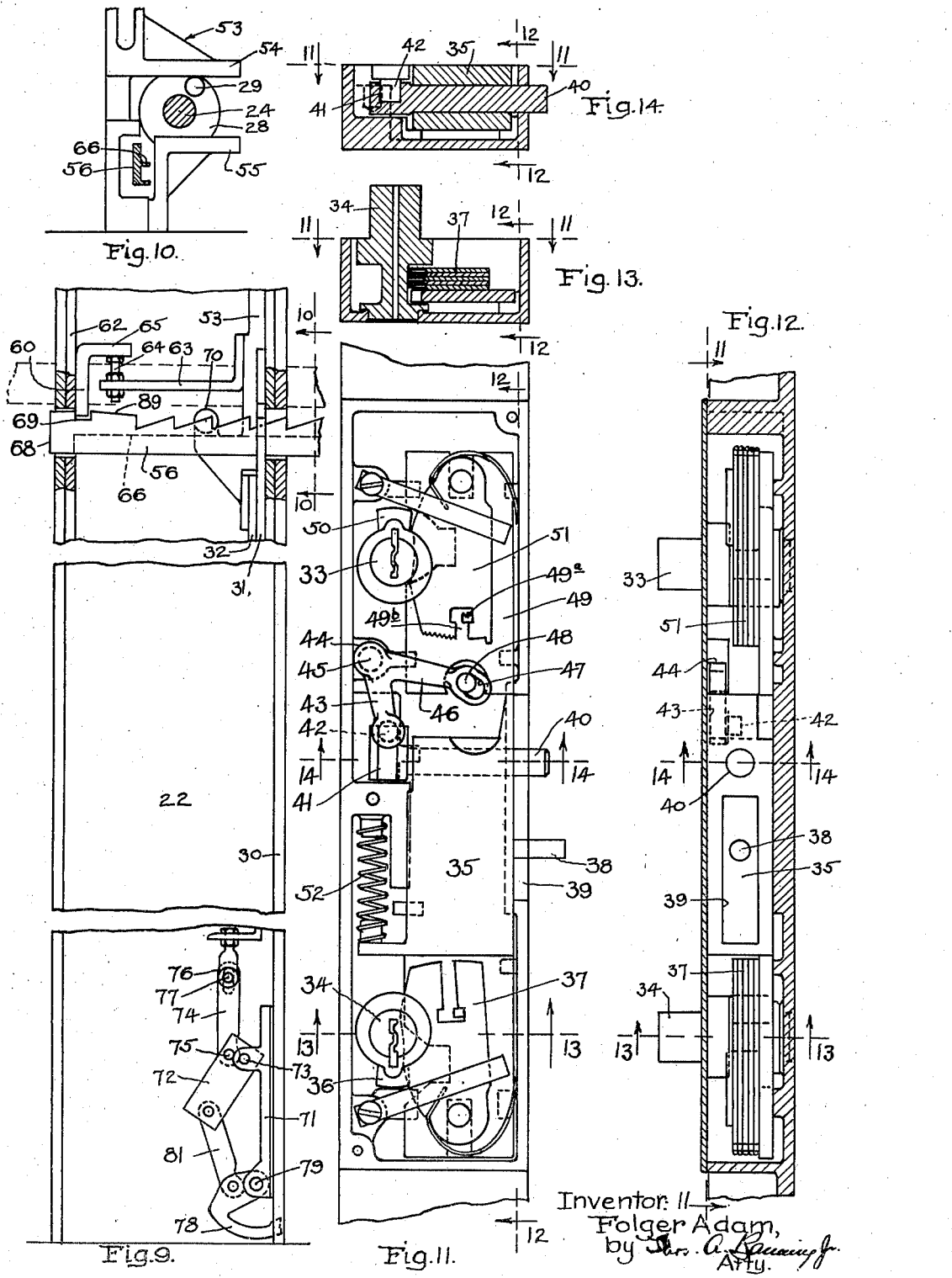

Feb. 28, 1939.  F. ADAM  2,148,521
JAIL LOCKING DEVICE AND THE LIKE
Filed May 27, 1937  4 Sheets-Sheet 4
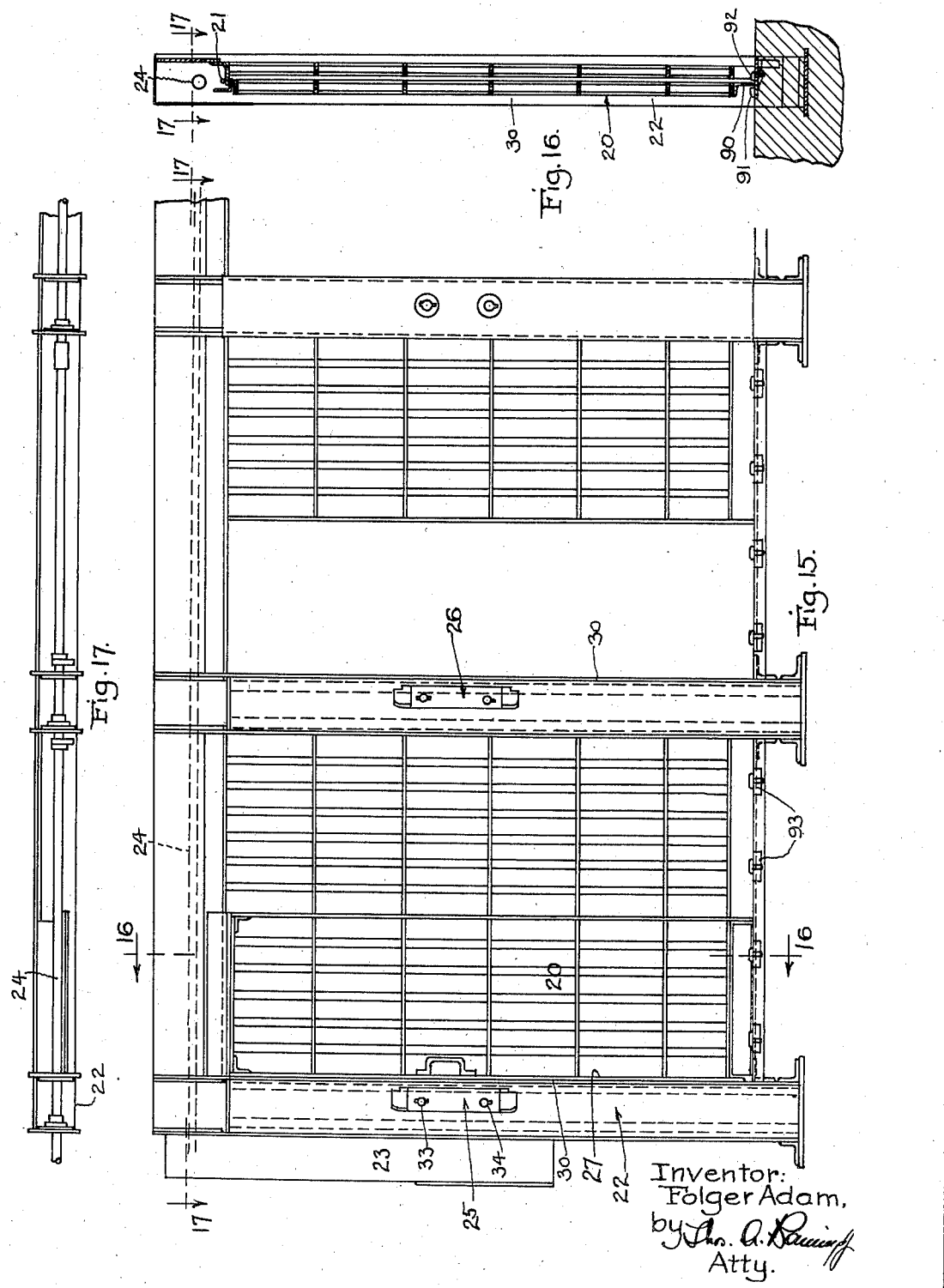
Inventor:
Folger Adam,
by Thos. A. Banning
Atty.

Patented Feb. 28, 1939

2,148,521

UNITED STATES PATENT OFFICE 2,148,521

JAIL LOCKING DEVICE AND THE LIKE

Folger Adam, Joliet, Ill.

Application May 27, 1937, Serial No. 145,136

20 Claims. (Cl. 189—7)

This invention relates to improvements in jail locking devices and the like. The improvements herein set forth are intended especially for use in connection with jails, but it will presently appear that said features may also be used in connection with the locking devices for other institutions in which it is necessary to make provision for securely retaining the inmates, such as asylums etc., and where it is desired to make provision for various operations of locking and unlocking the cell doors for the various cells or rooms.

Generally speaking, the features are intended for use in connection with cell doors which are of the sliding type, as distinguished from doors which swing on hinges, but it will appear that certain of the features are not limited to the sliding type of construction. Furthermore, the arrangements are such that the various doors may be controlled in gangs or groupings, and for various conditions of co-ordination, in the locking and unlocking operations, all as will be presently disclosed herein. In this connection, it may be mentioned that the present arrangement is one in which the locking devices for the doors of a gang may be gang controlled from a gang station under control of a warden or his deputy; and an arrangement such that the locking devices may be placed in the "deadlock" position, in which each cell is deadlocked so that it cannot be unlocked by a key inserted into the lock of such cell; or a "key lock" position, in which the lock of any individual door may be locked or unlocked by the use of a key inserted into the lock of such cell door, the locks of the other doors being left in their previous conditions; or an "open" position, in which the locks of the cells are moved to the disengaged position so that the doors may be opened without the need of key operations at the various doors; or a "locked open" position, in which the doors are locked in the open condition; and a "front cover plate release position", in which the lock for the cover plate which conceals certain of the mechanisms is unlocked so that said mechanisms may be reached for repair or adjustment, etc.

Generally speaking, it may be stated that the construction herein disclosed is such that by movements of a single element, such as a shaft, the locking devices are both controlled as to their conditions of locking and unlocking, and are also operated for locking and unlocking operations under certain desired conditions. That is, a single element serves both as a controlling and as an operating element for the locking devices.

Frequently, the installation is one in which the actual movements of opening and closing the doors are performed by the prisoners in the several cells, the gang mechanism serving to take care of the locking devices only. In such an installation it is desirable to be able to ensure proper closure of all the cell doors of the gang before the gang locking mechanism is moved to the locking position, as otherwise a prisoner or a number of prisoners might be able to hold their doors slightly open when the gang element was moved to the locking position, thus preventing proper functioning of their respective door locking devices, and making escapes possible after the gang element had been moved to the deadlocked position. One feature of the present invention is to make provision for preventing movement of the gang element to the deadlocking position unless all of the doors of the gang of cells have been moved to the fully closed position, wherein they will be properly locked when the gang element is finally moved to its locking position. In case the door of any cell is not in its fully closed position when the gang element is moved, said element cannot be moved to the locking position, and the warden or his deputy is thereby informed that one of the doors is not in fully closed position.

Another feature of the invention relates to the provision of an arrangement such that the locking mechanism of any cell door may be disconnected from the gang element so that such cell door will remain in locked condition notwithstanding the operations of the gang element, so that such cell door may be isolated from the other doors, and may be kept in the locked condition. This makes it possible to treat any given cell door individually, so that the various prisoners may be given individual treatment when necessary.

Another feature of the invention is to provide an arrangement such that the parts are accommodated within a minimum amount of space; of very sturdy construction; one using a minimum number of parts, of simple form, and so related that they will not readily get out of order; an arrangement such that when the cell doors are closed the possibility of tampering by the prisoners is reduced to a minimum; an arrangement such that in case of damage to any individual cell door lock the improper functioning or lack of functioning of the same will not interfere with the proper functioning of the remaining cell door locks and parts. It is also an object to make proper provision for adjustments during installation, so that when the locking devices and controls have been installed they will properly function, regardless of slight errors of positioning of the cell frames and parts, measured from the gang control station, in which the various control levers and parts are placed.

Another feature of the invention relates to the provision of an improved and new form of lock device, wherein by the use of a suitable control key the locking element of any cell to which such lock device relates may be connected to or disconnected from the lock operating bar of the gang mechanism; and in this connection it is an object to provide an arrangement such that the operations of the key lock mechanism will be very positive and certain, and readily performed by the intended key operations.

Another feature of the invention relates to an arrangement such that the exposed pilaster plate or door buck against which the closing edge of the door travels may be left entirely clear and devoid of any projecting parts or openings, substantially throughout its entire height excepting a single opening near the floor line through which one of the locking elements is projected at the time the door is locked shut; and this particular opening is at all times fully occupied by the locking element just referred to so that at no time is there any exposed opening either when the door is opened or shut, locked or unlocked, or in any intermediate position.

Another feature of the invention is to avoid the necessity or presence of any projection from either the pilaster plate or the door, which projection when used would be objectionable because it would restrict the space of the door opening and constitute a danger to both prisoners and guards when passing through the door opening.

Other objects and uses of the invention will appear from a detailed description of the same, which consists in the features of construction, and combinations of parts hereinafter described and claimed.

In the drawings:

Figure 1 shows in diagrammatic form the principal parts of the locking devices for a single cell, the same being in their "front cover plate release position", wherein the cell door is locked, but the front cover plate for certain of the operating parts is released;

Figure 2 shows a section on the line 2—2 of Figure 1 looking in the direction of the arrows;

Figure 3 shows a view similar to that of Figure 1, but with the parts in the "deadlocked position";

Figure 4 shows a section on the line 4—4 of Figure 3, looking in the direction of the arrows;

Figure 9 shows a view similar to those of Figures 1, 3, 5 and 7, but with the parts in the "locked open position", in which the door cannot be shut without further operation of the master or gang shaft;

Figure 10 shows a section on the line 10—10 of Figure 9 looking in the direction of the arrows;

Figure 11 shows a face view of a typical lock for one of the doors, for the key operations, the cover plate of the same being removed, and is a section on the lines 11—11 of Figures 12, 13 and 14, looking in the directions of the arrows in said figures;

Figure 12 shows a longitudinal section on the lines 12—12 of Figures 11, 13 and 14, looking in the directions of the arrows;

Figure 13 shows a cross-section on the lines 13—13 of Figures 11 and 12, looking in the directions of the arrows;

Figure 14 shows a cross-section on the lines 14—14 of Figures 11 and 12, looking in the directions of the arrows;

Figure 15 shows a face view of the end cell of a gang, and the next adjacent cell thereto, embodying certain of the features of the present invention;

Figure 6:
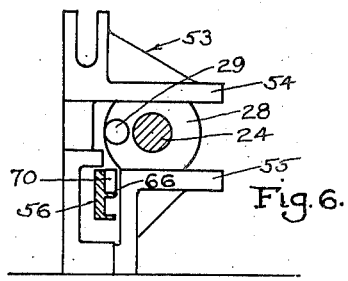
Figure 6 shows a section on the line 6—6 of Figure 5, looking in the direction of the arrows.

Figure 16 shows a cross-section on the line 16—16 of Figure 15, looking in the direction of the arrows; and Figure 17 shows a longitudinal section on the lines 17—17 of Figures 15 and 16, looking in the directions of the arrows.

Referring first to Figures 15, 16 and 17, I have therein shown the features of the present invention as incorporated in an arrangement in which a gang of cells with the sliding doors, such as 20, is provided. Each of these doors is carried by suitable hangers suspending its upper edge from the rail 21, in the form of a track or rod, above the upper edge of the door. In its closed position the door comes close to the pilaster or post 22; and in Figure 15, the pilaster 22 is at the end of the gang, and the gang control box 23 is carried by said pilaster for control of the cells of such gang. I do not herein concern myself particularly with the details of such control box, inasmuch as any suitable form of control mechanism may be provided for operating the master or gang shaft to be presently described.

The master or gang lock control shaft 24 extends from the control box 23 lengthwise of the gang of cells, and above the door positions. This shaft is adapted for turning movement through something more than one-half turn, and the various positions of the locking devices for the several cells are determined by the degree of turn of this shaft from its initial position. Such turn is effected by the lever or other device in the control box according to well-understood principles in the art.

Mounted on each pilaster at the closed position of each door is a key operated device which serves to control certain of the operations transmitted from the gang or master control shaft to the cell door locks. Two of these key devices are shown at 25 and 26 in Figure 15. The actual locking functions are performed by other devices, presently to be described. One of these acts to engage the lower end of the end bar or plate 27 of the door, and other engaging devices serve to engage the upper portion of the door, or a bar secured thereto, as will presently appear.

It is to be noted that there are no devices engaging the central portion of the edge of the door, and that the engagements just referred to are at the bottom and top portions of the edge of the door, so that the entire closing edge of the door is left wholly without any projections whatsoever, and also the face of the pilaster to which the edge of the door travels is left unmarred and without projections, and as a flush surface. This fact makes it possible to avoid any danger of persons becoming caught or hooked and thereby injured, by contact with such projections, and furthermore this arrangement makes it impossible for the prisoner to tamper with such projections, and thereby reduces the possibility of his injuring or rendering inoperative the locking devices of his cell. In this connection, it will also presently appear that when the engaging device for the lower end of the door edge is retracted into the unlocked position it serves to completely close the opening through which it was projected during the locking operation, so that the prisoner cannot then tamper with the engaging hook. Also, the door locking devices for the upper portion of the door are completely hidden or protected so that they also are not available for tampering by the prisoner.

Referring now to Figures 1 and 2, (and also to the other Figures 3 to 10 inclusive), the master or gang shaft 24 carries a block 28 for each door, which block travels with the shaft as it is rotated. Such block carries an endwise projecting pin 29. This pin normally stands in the position of Figure 4, which is the ganglocked position. The shaft may be rotated in either direction from the position shown in Figure 4, but the rotation to the position of Figure 2 is backward, and is only performed for the purpose of releasing the cover plate; and the normal unlocking and controlling operations are performed by rotations of the shaft in the other direction from the position of Figure 4.

Slidably mounted adjacent to the inner face of the plate 30 which is one of the pilaster plates there are the two bars 31 and 32, respectively. The bar 31 is longer than the bar 32, and reaches from a position adjacent to the control shaft 24 down to a position near the lower end of the end plate 27 of the door, when the latter is in closed position. This bar 31 may be called the locking bar. The bar 32, on the other hand, extends from a position close to the control shaft down to a position opposite to the lock device 25. This bar 32 may be called the operating bar; and it is moved up and down directly by movements of the control shaft, primarily. The lock device 25 serves, under certain conditions to connect the two bars 31 and 32 together so that up and down movements of the bar 32 will be communicated to the bar 31 under dictation of the control shaft; and under other conditions the lock device 25 does not connect the two bars together, but allows the bar 31 to be moved up and down under dictation of a key lock device constituting a portion of the device 25, the up and down movements of the operating bar 32 under dictation of the shaft being not communicated to the bar 31.

At this point reference may be had to Figures 11, 12, 13 and 14 which show in detail the construction of the locking device 25. This device includes the upper and lower key cylinders, 33 and 34, respectively, which may be operated either by the same or different keys. There is a block 35 within the device which is capable of up and down movements under impulse of the key cylinder 34, through the medium of the sweep 36; the usual tumbler plates 37 being provided to necessitate the use of a proper key. The block carries the sidewise projecting pin 38 which extends out through the slot 39, and this pin 38 engages a suitable hole in the locking bar 31, so that up and down movements of the block 35 and pin 38 cause the locking bar to rise and fall. This is therefore performed by key operation, under control of the key inserted into the cylinder 34.

The block 35 also carries the pin 40 which is slidably mounted in said block and can therefore be moved in and out therein. Said pin carries the slotted end portion 41 which is engaged by a pin 42 on the arm 43 of the bell crank 44, which bell crank is pivoted at the point 45. The other arm 46 of this bell crank has the slot 47 which is engaged by the pin 48, which pin 48 is carried by the block 49 movable up and down within the lock casing under impulse of the sweep 50 operated by the key cylinder 33, the usual tumblers 51 being provided for making the use of the proper key necessary. When the block 49 is lowered the bell crank is rocked to withdraw the pin 40 from the position shown in Figure 11, and in the position of Figure 11 said pin is projected far enough to engage a hole in the operating bar 32. When the pin is withdrawn it ceases to engage said hole, and at such time the operating bar and the locking bar may rise and fall independently of each other. When the pin is in the projected position the two bars must rise and fall together. When the block 49 is fully lowered to withdraw the pin 40 from the operating bar, said block 49 rests against the block 35 and prevents the block 35 from rising. At such time the post 49ª has moved through the gate 49ᵇ and assumed a position beneath the tumblers 51 so as to lock the block 49 in the lowered position. Thus the locking bar 31 is deadlocked down and cannot be raised.

From the above it will be seen that this key lock device provides means whereby the operating bar and the locking bar may either be connected together so that the movements of the operating bar will be communicated to the locking bar, whereupon the various functions of control of the locking and unlocking will be delivered from the master or gang shaft to the locking elements, or whereby the movements of the locking bar may be performed by the use of the key lock device.

The spring 52 may be provided for assisting the lowering of the block 35, if desired; and proper guides for the moving parts may be provided as illustrated in Figures 11, 12, 13 and 14.

The upper end of the operating bar 32 carries the yoke member 53 having the upper and lower fingers 54 and 55 respectively, between which travels the pin 29, (see Figures 2, 4, 6, 8 and 10). These fingers are so spaced that during certain travels of the parts either the yoke may travel independently of the finger or vice versa; but the rotation of the shaft and block 28 will cause the finger to ensure proper movements of the yoke, and therefore, of the operating bar.

The rack bar 56 is connected to the upper portion of the cell door, as by the jointed member 57, which can be adjusted slightly back and forth by the set screw 58. This rack bar is suitably guided, as by the roller 59, supporting its bottom face. There is a vertically movable pin or lug 60, guided by the bracket 61 mounted on a stationary part 62, so that said pin or lug may engage the teeth of the rack bar to prevent backward movement thereof, that is, in the door opening direction, but during the door closing movement the rack bar may travel to the left and "click" past the rack teeth. This rack and pin arrangement therefore provides a means for continuously locking the door against opening movement unless and until the pin is raised away from the rack. The yoke member 53 also carries the laterally extending bracket 63, having the vertically adjustable pin 64; and the rack pin or lug 60 has the sidewise projecting arm 65 which overlies the pin 64, so that when said pin is raised it will raise the rack pin with it into the non-rack-engaging position. Under such conditions the door may be opened without interference from the rack.

On the back face (or inner face of the rack bar) is the rail 66 which extends parallel to the rack for most of its distance, but which rail rises on an easy slant shortly before the door closed position is reached, as well shown in various figures, and said rail finally terminates, at the door closed position, at the dead-end 67. Also, at the completely door opened position said rail terminates at the dead end 68, (see Figure 9), but the notch 69 is provided in the upper edge of the rack bar to receive the rack pin 60 for locking the door in completely opened position, (see Figure 9). The yoke member 53 carries the roller 70 which rides on the rail 66, so as to support the yoke and therefore the operating bar with respect to said rail under proper conditions. It will be obvious that during the door opening movement to the position of Figure 9 the rack pin 60 will finally be allowed to fall into the notch 69 so to lock the door fully opened, and that during the door closing movement the rack pin will be able to "click" past the rack teeth, and shortly prior to the completely door closed position the roller 70 will ride up on the end slant of the rail 66, and just as the door is completely closed said roller will drop down back of the end of the rail, and thereby permit the operating bar to make a complete descent to a lowermost position.

The lower end of the locking bar serves to operate the door locking hook device shown in Figures 1, 3, 5, 7 and 9. This device includes the bracket plate 71 which is vertically adjustable with respect to the pilaster bar 30, previously referred to. There is a plate or block 72 pivotally connected to the upper portion of the bracket at the point 73; and a link member 74 has its lower end pivotally connected to the plate or block 72 at 75, and its upper end adjustably connected to the lower end of the locking bar 31 by the pin connection 76 pivoted thereto at 77. The bracket member 71 has the lock hook 78 pivotally connected thereto at 79 so that said hook may swing out into the locking position of Figures 1, 3, 5 and 9, or may be withdrawn back into the unhooking position of Figure 7. It is to be noted that this locking hook is formed on the arc of a circle drawn about the pivotal point 79 as a center, and the engaging end 80 of this locking hook is so placed that when the hook is in locking engagement with the lower end of the door edge plate 27 (as shown, for example, in Figures 1 and 3), door opening pressure against the engaging end 80 will be exerted directly in line with the pivotal point 79, so that the door opening force will not tend to cause any disengaging movement of the locking hook. In other words, the hook is at such time on "dead center".

There is the link 81 having its lower end pivotally connected to the locking hook, and its upper end pivotally connected to the plate or block 72; and these pivotal connections are so made, that when the locking bar is fully lowered as shown in various figures, the plate 72 and linkages connected thereto, may break back into a toggle position, such that any upward force exerted by the backward rocking tendency of the hook 78 will serve to lock the hook against such tendency, and thus still further ensure against any disengaging of the hook from the lower edge of the door due to a door opening force at such time.

When the locking bar 31 is raised into a position such as that of Figure 9 the plate 72 draws the hook back into the disengaging position so as to release the lower edge of the door; and due to the curvature of the hook about the pivotal point 79 as a center such backward rocking is possible with a minimum amount of clearance with respect to the lower end of the door edge plate 27. It is to be noted that when the door hook 78 is in the position of Figures 7 and 9 it may be desirable to provide supplemental means to retain the hook in such position, for which purpose there may be provided, if desired a "click" or other device at the pivotal point 79 so that the same will properly engage to secure such result, but will not hold the hook so firmly as to prevent its proper functioning when moved under the force of the actuating mechanism.

Figure 7:
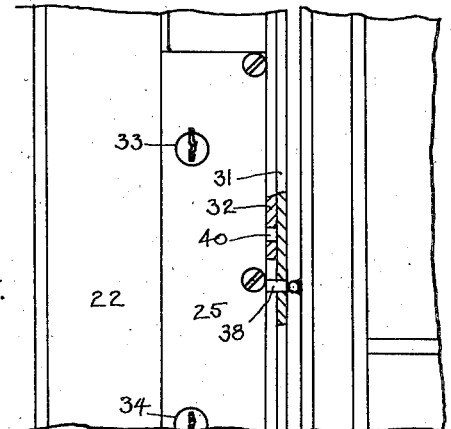
Figure 7 shows a view similar to those of Figures 1, 3 and 5, but with the parts in the "open position" in which the door has been unlocked and opened.

It is noted that the hook 78 extends through a hole in the pilaster plate 30, and such hole, due to the fact that the hook is formed on the circular arc about the pivotal point 79, may be made of the same size as the cross-section of the hook, and therefore comparatively small; and furthermore, due to this fact, when the hook is withdrawn back into the unlocked position of Figures 7 and 9, the hook will completely close the hole in the pilaster plate, so that there is no opportunity for the prisoners to tamper with the mechanism by extending tools or implements through any such hole. This is an added feature of protection against tampering with the structure.

Having thus described the structures, I shall now explain certain of their possible operations, as follows:

Assuming that the parts are in the position of Figures 3 and 4, the cam pin 29 as shown is at its lowermost position so that it holds the yoke down by engagement against the lower yoke finger 55. Such being the case, the operating bar is held down, and under the condition that the key lock pin 49 is in the projected position of Figure 11 so that it is in engagement with the operating bar, the locking bar is thus also tied to the operating bar; and the consequence is that the downward holding of the operating bar by the cam pin 29 will serve to also hold the locking bar in its lowered and locking position. Thus the lower end of the door plate 27 is locked by the hook 78. It is also to be noted that the rack bar 56 extends through a slotted opening in the upper portion of the locking bar 31, and also that the rack bar has in its upper edge the notch 82 into which the lock bar may engage when the locking bar is fully lowered with the door in the fully closed position. It is thus evident that under the conditions depicted in Figures 3 and 4 the door is locked by engagement of locking members with both the top and bottom portions of its pilaster edge portion. It is also to be noted that under these conditions the roller 70 has descended past the end of the rail 66, so that door opening tendency will also be resisted by engagement of the end of the rail against such roller. In addition to the foregoing it is also noted that at such time the lowering of the operating bar has carried the finger 63 down so that the rack pin 60 is engaged with the rack teeth, so that any opening tendency exerted on the door will be resisted by the rack bar. Thus, in the position of these Figures 3 and 4, the door is locked by four separate and distinct instrumentalities.

It is also to be noted that when the parts are in the position of Figures 3 and 4, with the yoke finger 55 engaged with the cam pin 29, it is impossible for any one to raise the locking bar by use of a key inserted into the lock cylinder 34, because the locking bar and the operating bar are connected together; but even should the locking and operating bars be disconnected by operation of the key cylinder 33, still the engagement of the rack pin 60 with the rack bar, and the engagement of the roller 70 with the end of the rail 66, would prevent any opening of the door, since these parts are connected to the operating bar, and not the locking bar. In other words, the locking functions are performed both by elements directly connected to the locking bar and by elements connected to the operating bar, two in each case.

Figure 5:
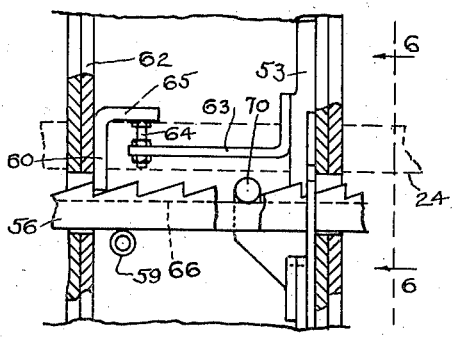
Figure 5 shows a view similar to those of Figures 1 and 3, but with the parts in the "key position" which in the lock of the cell door in question may be operated by the lock operating key for such door independently of the master or gang shaft.
Figure 5:
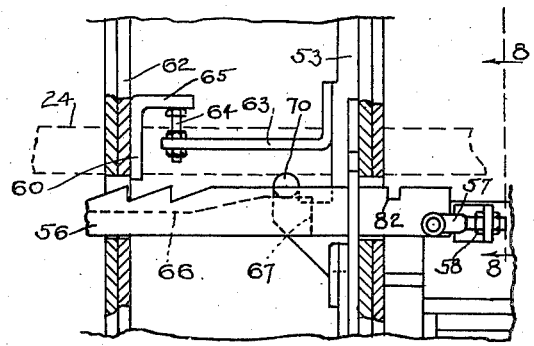
Figure 5:
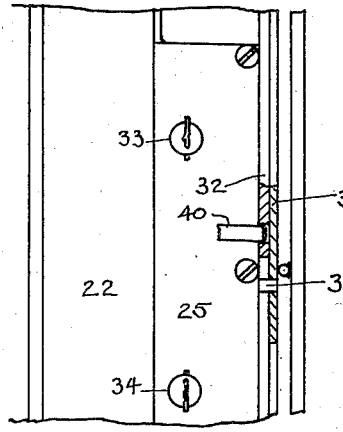

If now the control shaft be turned clockwise a quarter turn to the position of Figures 5 and 6, so that the cam pin 29 is raised away from the bottom finger 55 of the yoke, into a central position in the yoke, it will be possible to raise the locking and operating bars sufficiently to disengage the locking elements and permit the door to be unlocked. Such unlocking will not be performed by the shaft movement to this point, but the release will be sufficient to permit key unlocking movements. In this connection with the key parts in the position of Figure 11 it is noted that the pin 40 connects the block 35 with the operating bar, thus connecting the two bars together; and under such conditions, operation of the key cylinder 34 by insertion of a key therein, will serve to raise the locking bar to disengage the locking elements which are directly connected thereto, and will also serve to raise the operating bar and thus disengage the locking elements which are connected thereto. Thus, when the parts are in the position of Figures 5 and 6, the door may be unlocked by use of a key inserted into the lock cylinder 34; permitting any given cell door to be key unlocked, and leaving the other cell doors in locked condition so that the prisoners therein will not be released.

Figure 8:
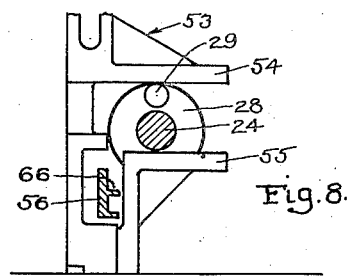
Figure 8 shows a section on the line 8—8 of Figure 7, looking in the direction of the arrows.

By turning the control shaft a further quarter turn in the clockwise direction to the position of Figures 7 and 8, the cam pin 29 will engage the upper finger 54 of the yoke, and cause the yoke and operating bar to be raised to the full extreme. This will carry the operating bar high enough to disengage the locking elements which are directly connected to it, namely, the rack pin from its rack, and the roller from the end 67; and when the locking bar is connected to the operating bar by the pin 40 being positioned as shown in Figure 11, this extreme upward movement of the operating bar will carry the locking bar up high enough to also disengage its locking elements, namely, the hook 78 at its lower end, and the locking bar from the notch 82. Thus the control shaft has, by its half turn from the position of Figures 3 and 4 to that of Figures 7 and 8, completely unlocked the door.

It is to be noted that by a further turn of the control shaft clockwise about thirty degrees to the position of Figures 9 and 10, the cam pin 29 has been dropped somewhat, so that the yoke has been allowed to lower the operating bar to a position where the finger 60 may engage the notch 69 for the door locked open condition, the roller 70 still being high enough to ride over the rail 66, and the locking bar still being held high enough to prevent its elements from performing their locking functions. In other words, in the position of Figures 9 and 10, the door may be fully opened, and will lock in such open condition. Return of the control shaft to the position of Figures 7 and 8 will raise the yoke sufficiently to disengage the rack pin from the notch 69, and allow the door to be closed. Suitable door starters may be provided for starting the door in either direction.

It is noted that mounted on the control shaft is a disk 83, (see Figures 1 and 2), having the axially extending flange 84, which flange is mutilated at the point 85. The proper lock control devices are contained within a box having the removable cover plate 86, (see Figure 2), which cover plate is normally locked in place, but may be removed for purposes of inspection and adjustment of parts, etc. This cover plate has secured to its inner face the angle section 87, and said angle section has the recess or notch 88 which receives the flange 84 of the disk 83 when turned to the proper position. When the control shaft is in any of the positions of Figures 3 to 10 inclusive, the flange 84 is extended through the notch 88 so that the cover plate is locked to the box, but by turning the control shaft backwardly, that is, counterclockwise from the position of Figures 3 and 4, to that of Figures 1 and 2, the mutilation of the flange is brought to the proper point to ensure disengagement of the cover plate lock. It is to be noted that such disengagement is effected without sufficient movement of the cam pin 29 upwardly to allow the yoke to rise enough to disengage the locking devices, so that the locking devices will be kept in the deadlocked condition when the cover plate is released.

It is to be noted that when the control shaft is in the key locked position of Figures 5 and 6, the door may be moved in the closing direction, and as such movement proceeds the door will be continuously retained against any backward or opening movement, due to engagement of the rack pin with the rack teeth; thus preventing the prisoner from taking advantage of the incompletely closed condition of the door. Also, as the door approaches the closed position the roller will rise on the upwardly slanting end portion of the trackway 66, thereby raising the operating bar, and with it the locking bar (assuming that the two bars are connected together by the proper positioning of the key cylinder 33), so that just before the door reaches its fully closed condition the locking bar will be raised sufficiently to allow the proper engagement with the notch 82, and also to ensure momentary rocking of the hook 78 from a position of interference with the lower end of the door bar 27. Also, such momentary raising of the operating bar will be followed by the dropping of the roller 70 back of the end of the rail 67 into the locking position.

It is also to be noted that during the opening movement of the door to the position of Figures 9 and 10, the rack pin 60 will travel upwardly slightly by engagement with the slanting portion 89 of the rack bar, thus permitting the rack pin to finally drop down into the notch 69 when the door is fully opened, and locking the door in the fully opened position.

Reference to Figures 15 and 16 will show that the lower edge of the door is provided with the downwardly extending flange 90 which travels between the lips 91 and 92 of the fixtures 93 secured to the floor of the cell beneath the door.

These lips serve to prevent sidesway of the door, and also guide it during its travels.

It is to be noted that with the arrangements herein disclosed the edge portion of the door is left completely unmarred by any projections or openings; and also the face plate of the pilaster is left completely unmarred by any projections or openings, with the exception of the opening through which the hook 78 travels, so that the arrangement presents the advantage that a very "clean" finish is provided without obstructions or openings.

It is also to be noted that by the arrangements herein disclosed the locking devices may be operated and controlled with great flexibility, either completely by the control shaft or by the key operations.

While I have herein shown and described only a single embodiment of the features of my present invention, still I do not intend to limit myself thereto, except as I may do so in the claims to follow.

I claim:

1. In a jail locking mechanism, the combination of parallel operating and locking bars, a transversely extending control shaft, key locking devices for key connecting the operating and locking bars together, operative connections between the shaft and the operating bar, suitable door locking devices connected to the locking bar, suitable door locking devices connected to the operating bar, and key operated devices for operating the locking bar the operating bar being closer to the key locking devices than the locking bar, substantially as described.

2. In a jail locking mechanism, the combination of operating and locking bars, a transversely extending control shaft, operating connections between the shaft and the operating bar, permitting lost motion between said parts, suitable door locking devices in connection with the operating bar, suitable door locking devices in connection with the locking bar, key operated mechanism for key connecting the two bars together, and key operated mechanism for operating the locking bar, substantially as described.

3. In a jail locking mechanism, the combination of operating and locking bars, a transversely extending control shaft, operating connections between the shaft and the operating bar, permitting lost motion between said parts, suitable door locking devices in connection with the operating bar, suitable door locking devices in connection with the locking bar, means to connect the bars together under operator control, and key operated mechanism for operating the locking bar independently of the operating bar, substantially as described.

4. In a jail locking mechanism, the combination of operating and locking bars, means to move the operating bar under control, locking devices in connection with each bar, means to connect the bars together under operator control, and permitting non-connection of said parts, and means for moving the locking bar by operator control independently of the operating bar movements, substantially as described.

5. In a jail locking mechanism, the combination of operating and locking bars, remote control means to operate the operating bar, key operated means to connect the two bars together, key operated means to operate the locking bar, and suitable door engaging locking devices in connection with each bar, substantially as described.

6. In a jail locking mechanism, the combination of operating and locking bars, key control means to connect the bars together, and permitting them to be disconnected, remote control means to operate the operating bar, and suitable door engaging locking devices in connection with each bar, substantially as described.

7. In a jail locking mechanism, the combination of operating and locking bars, extending parallel to the door edge, there being a projection extending downwardly from the lower portion of the closing edge of the door, a circular hook element pivotally mounted for rotary movement about a center co-axial with the curvature of the hook, said hook being adapted to extend around the said downwardly extending projection for locking purposes, and being adapted to engage the projection on a transverse line extending through the pivotal point aforesaid, together with an operative connection between the locking bar and the hook, and means to at times connect the operating and locking bars together, substantially as described.

8. In a jail locking mechanism, the combination of a locking bar vertically movable parellel to the edge of a door to be locked, a downwardly extending projection on the closing edge of the door, a circular hook pivotally mounted on a pivot co-axial with the pivotal point of the hook, the hook being adapted to reach around the lower end of the projection and engage the projection on a line extending transversely through the pivotal point, and a toggle connection between the lower portion of the locking bar and the hook, permitting control of the hook by vertical movements of the locking bar and preventing unhooking movements of the hook when the locking bar is in the locking position, substantially as described.

9. In a jail locking mechanism, the combination of a locking bar movable parallel to the edge portion of a door to be locked, a circular hook mounted on a pivot adjacent to the lower door closed edge portion of the door, said pivotal mounting being on the center of the hook circle, an operative connection between the locking bar and the hook, including toggle means, operative to prevent backward movement of the hook from the locked position under impulse of force against the hook, and means to operate the locking bar, substantially as described.

10. In a jail locking mechanism, the combination of two bars, one being an operating bar and the other a locking bar, suitable door engaging locking devices in connection with each bar, key operated means to at times connect the bars together, and other key operated means to at times move the locking bar, substantially as described.

11. In a jail locking mechanism, the combination of two bars, one being an operating bar and the other being a locking bar, suitable door engaging locking devices in connection with each bar, key operated means to at times connect the bars together, key operated means to at times move the locking bar, and supplementary means to move the operating bar, substantially as described.

12. In a jail locking mechanism, the combination of a door, a slidable mounting therefor, a rack bar connected to the door, a rack pin for engagement with the teeth of the rack to prevent door opening movement, means to engage the lower edge portion of the door for locking purposes, supplemental means to engage the rack bar for door locking purposes, and means to control engagement of the locking devices selectively under operator control, substantially as described.

13. In a jail locking mechanism, the combination of a door, a slidable mounting therefor, a rack bar connected to the door, a rack pin for engagement with the teeth of the rack bar to prevent door opening movements, means to engage the lower edge portion of the door for locking purposes, means to engage the rack bar for locking purposes supplemental to the rack pin, remote control means to control engagement of all said locking means, and key operated means local to the door for controlling certain of said locking means, substantially as described.

14. In a jail locking mechanism, the combination of a door mounted for slidable movement, a face plate to which the door is adapted to travel when in closed position, said face plate being smooth throughout its vertical dimension, and unbroken by projections or openings, there being a single opening in the lower portion of the face plate at the position of the bottom edge of the door when the door is closed, a curved hook fully occupying said opening at all times, a projection on the lower edge portion of the closing edge of the door, the hook being adapted to engage said projection for locking purposes, and means to control the hook, substantially as described.

15. In a jail locking mechanism, the combination of a door, a slidable mounting therefor, a face plate to which the door comes when fully closed, said face plate being smooth and unbroken by projections or openings throughout its vertical dimension from the top to the bottom of the door, there being a single opening in the lower portion of the face plate at the lower edge position of the door when closed, a curved hook working through said opening, a downward projection on the lower edge portion of the door in position to be engaged by said hook when the hook is extended, the hook fully occupying the opening aforesaid, means to operate the hook for locking purposes, and supplemental means to lock the upper edge portion of the door, substantially as described.

16. In a jail locking mechanism, the combination of a door, a slidable mounting for the door, a face plate to which the door comes when in the closed position, said face plate being smooth and unbroken by projections or holes throughout its vertical dimension, locking means for engagement with the lower edge portion of the closing edge of the door, locking means for engagement to lock the upper edge portion of the door, and means to guide the door in its sliding movements, substantially as described.

17. In jail locking mechanism, the combination of remote control means to control door locking, local means to also control door locking, means to connect both of said means together, and permitting their disconnection, two locking devices in connection with the remote control means, and two locking means in connection with the local means, substantially as described.

18. In jail locking mechanism, the combination of locking means to lock the lower edge portion of a sliding door, and three means to lock the upper edge portion of the door, and means to control all of said locking means selectively, substantially as described.

19. In a jail locking mechanism, means to lock the door against sliding movement, comprising a curved hook formed on the arc of a circle, a pivotal mounting for said hook permitting rotary movement of the hook about its center as a pivot, said pivotal mounting being on an axis transverse of the direction of door movement, a projection on the door in position for engagement by said hook, and means to rotate the hook, substantially as described.

20. In a jail locking mechanism, the combination with a slidable door having a projecting member extending in a direction transversely of the door movement, of means to engage said projecting member, comprising a curved hook formed on the arc of a circle, a pivotal mounting for said hook permitting rotary movement thereof about an axis extending transversely of the direction of door movement and concentric with the curve of the hook, together with means to rotate the hook under control, substantially as described.

FOLGER ADAM.